United States Patent [19]

Keddie

[11] Patent Number: 5,713,258
[45] Date of Patent: Feb. 3, 1998

[54] COMPOUND MITER BOX

[75] Inventor: David P. Keddie, Brookfield, Wis.

[73] Assignee: Hempe Manufacturing Co., Inc., New Berlin, Wis.

[21] Appl. No.: 550,673

[22] Filed: Oct. 31, 1995

[51] Int. Cl.[6] .................................................. B27G 5/02
[52] U.S. Cl. .................................. 83/766; 83/767; 83/581
[58] Field of Search ................................ 83/758, 763, 764, 83/765, 766, 767, 581

[56] References Cited

U.S. PATENT DOCUMENTS

| | | |
|---|---|---|
| 30,027 | 9/1860 | Nash . |
| 45,055 | 11/1864 | Langdon . |
| 117,538 | 8/1871 | Hedges . |
| 151,139 | 5/1874 | Langdon . |
| 968,973 | 8/1910 | Peterson . |
| 976,296 | 11/1910 | Robbins . |
| 982,706 | 1/1911 | Burger . |
| 1,002,980 | 9/1911 | Fish . |
| 1,017,640 | 2/1912 | Miller . |
| 1,063,113 | 5/1913 | Bremer . |
| 1,075,730 | 10/1913 | Ross . |
| 1,096,072 | 5/1914 | Swanson . |
| 1,121,217 | 12/1914 | Wilson . |
| 1,134,286 | 4/1915 | Pelletier . |
| 1,167,478 | 1/1916 | Callahan . |
| 1,208,150 | 12/1916 | Hall . |
| 1,235,970 | 8/1917 | Guth . |
| 1,241,804 | 10/1917 | Wood . |
| 1,259,380 | 3/1918 | Eagleson . |
| 1,447,417 | 3/1923 | Johnson . |
| 1,458,951 | 6/1923 | Poole et al. . |
| 1,534,957 | 4/1925 | Hurley . |
| 1,633,409 | 6/1927 | Hoover et al. . |
| 1,653,386 | 12/1927 | Beyland . |
| 1,910,383 | 5/1933 | Eitmiear . |
| 2,708,466 | 5/1955 | Stoll . |
| 2,748,811 | 6/1956 | Chilton . |
| 3,586,075 | 6/1971 | Larsen . |
| 3,651,840 | 3/1972 | Ridenour . |
| 3,872,761 | 3/1975 | Gutowski et al. ............... 83/767 |
| 3,918,340 | 11/1975 | Wynn ............................... 83/765 |
| 3,948,136 | 4/1976 | Gutowski et al. ............... 83/767 |
| 4,241,634 | 12/1980 | Ambler ............................ 83/763 |
| 4,299,152 | 11/1981 | Ambler ............................ 83/763 |
| 4,365,531 | 12/1982 | Potvin ............................. 83/767 |
| 4,800,793 | 1/1989 | McCord, Sr. . |
| 4,875,399 | 10/1989 | Scott et al. ..................... 83/468.3 |
| 5,220,857 | 6/1993 | Freeburger ..................... 83/468.3 |
| 5,235,889 | 8/1993 | Brickner et al. ............... 83/471.3 |
| 5,259,284 | 11/1993 | Chen ............................... 83/468.3 |
| 5,259,286 | 11/1993 | Chen ............................... 83/766 |
| 5,392,679 | 2/1995 | Wang ............................... 83/766 |
| 5,575,191 | 11/1996 | Wang ............................... 83/766 |

FOREIGN PATENT DOCUMENTS

| | | |
|---|---|---|
| 91500352 | 4/1991 | Italy . |
| 80201769 | 1/1992 | Taiwan . |
| 80201769A01 | 3/1993 | Taiwan . |

*Primary Examiner*—Eugenia Jones
*Attorney, Agent, or Firm*—Andrus, Sceales, Starke & Sawall

[57] ABSTRACT

A compound miter box is provided wherein the saw guides are pivotable about a vertical and a horizontal axis. Each saw guide includes a retaining mount having a concave bearing surface defining a locating tab thereon. A saw supporting arm is pivotally mounted to the underside of the saw bench. The arm includes a plurality of tab receiving depressions therein. Each tab receiving depression corresponds to a predetermined angle between the saw guides and the saw bench. A user may then select and secure the locating tab in a tab receiving depression corresponding to the desired predetermined angle between the saw guides and the work supporting surface of the bench.

32 Claims, 2 Drawing Sheets

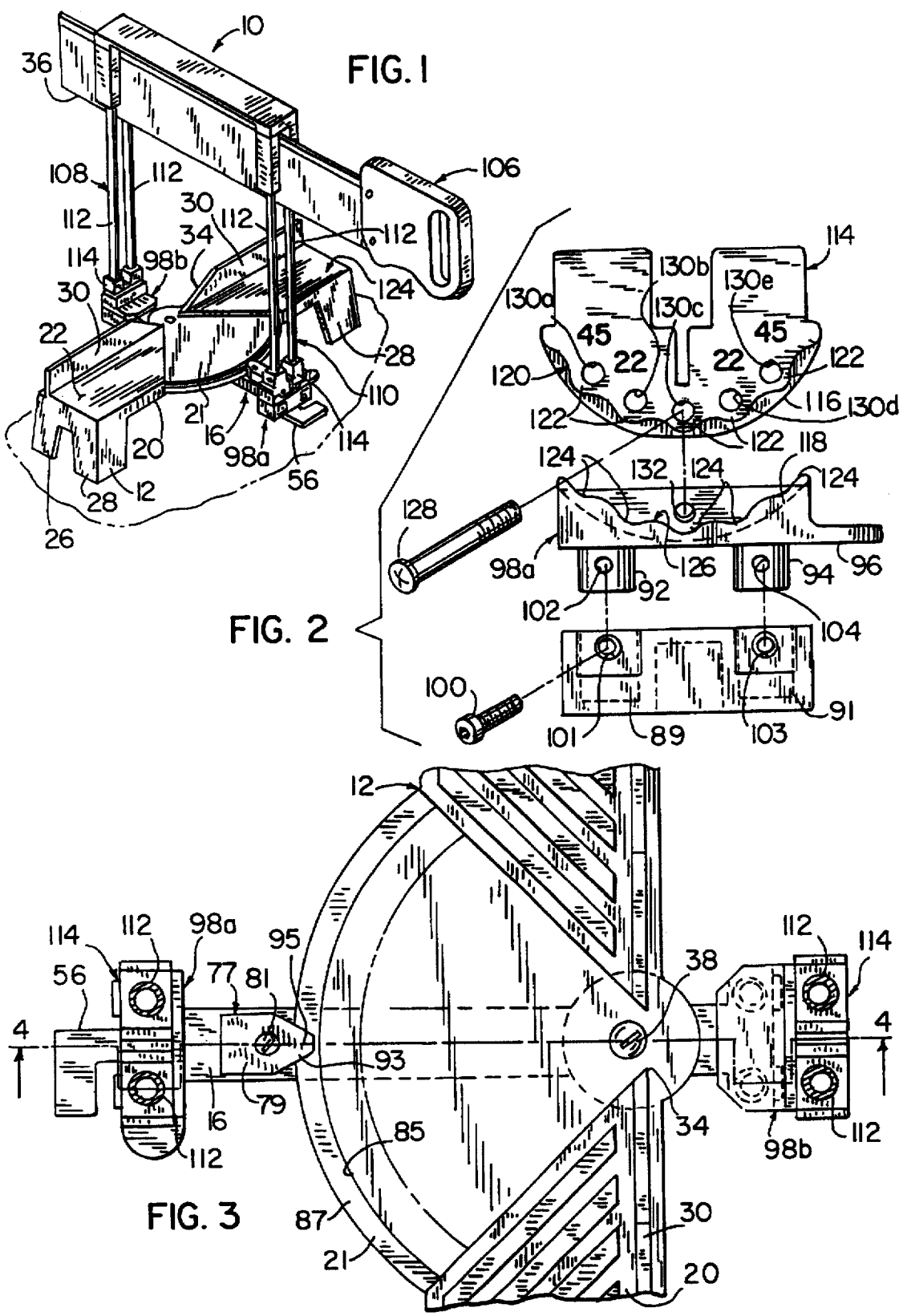

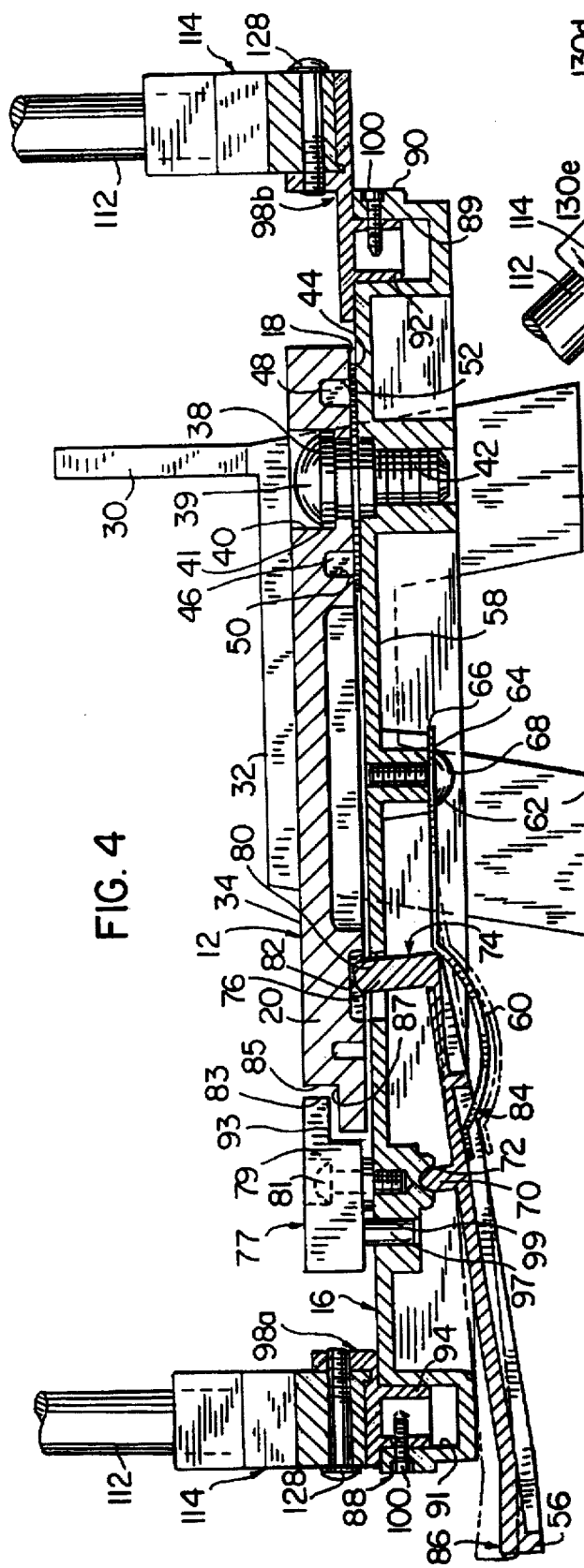

COMPOUND MITER BOX

BACKGROUND AND SUMMARY OF THE INVENTION

The present invention relates to a miter box, and, more particularly, to a compound miter box wherein the saw guides are pivotable about a vertical and a horizontal axis.

Miter boxes are well known and well developed in the prior art. The prior art discloses constructions which range from the very simple, including a true slotted box construction from which the name derives, to the very complex including sophisticated locating, alignment and clamping devices.

One problem associated with the use of a miter box is properly positioning a saw at an acute, vertical angle from the horizontal miter box table when it is desired to make compound miter cut of a board positioned on the table. For example, when making a 45° mitered saw cut in pieces of cove molding to be joined in the corner of a room, the saw must be positioned at the same angle with respect to the horizontal table and the vertical back stop that the molding will assume when fixed to the wall and ceiling. If properly positioned and cut, a miter joint in a piece of ornamentally complex cove molding is much simpler to make than a contoured cut with a coping saw.

It is a primary object and feature of the present invention to provide a compound miter box wherein the saw guides are pivotable about a vertical and a horizontal axis.

It is a further object and feature of the present invention to provide a compound miter box wherein the saw guides are easily rotatable to a predetermined angle with respect to the work supporting surface of the miter box.

It is a still further object and feature of the present invention to provide a compound miter box which is simple to utilize and inexpensive to manufacture.

In accordance with the present invention, a compound miter box is provided. The miter box includes a saw bench having an upper, work supporting surface, and an underside. A saw supporting arm is mounted to the underside of the saw bench and is pivotable about a longitudinal axis perpendicular to the work supporting surface of the saw bench.

First and second saw supports are also provided. Each saw support includes a pair of special parallel saw guide rods extending from a retaining mount. The retaining mount includes a concave bearing surface defining a locating tab thereon.

A receiving mount is mounted to each end of the saw supporting arm. Each receiving mount includes a plurality of tab receiving depressions. Each tab receiving depression corresponds to a predetermined angle between the saw guide rods, and the work supporting surface of the bench. Further, each tab receiving depression is dimensioned for receiving the tab depending from the retaining mount therein.

Means are provided for securing the tab of the remaining mount in a user selected tab receiving depression in the receiving mount which, in turn, secures the saw guides at a predetermined angle to the work supporting surface of the bench.

BRIEF DESCRIPTION OF THE DRAWINGS

The drawings furnished herewith illustrate a preferring construction of the present invention in which the above advantages and features are clearly disclosed as well as others which will be readily understood from the following description of the illustrated embodiment.

In the drawings:

FIG. 1 is an isometric view of the compound miter box of the present invention;

FIG. 2 shows an enlarged, front elevational view of a portion of the compound miter box of FIG. 1;

FIG. 3 shows a top plan view of a portion of the compound miter box of FIG. 1;

FIG. 4 is a sectional view of the compound miter box of the present invention taken along line 4—4 of FIG. 3;

FIG. 5 is an enlarged, front elevational view showing a portion of the compound miter box of FIG. 1; and FIG. 6 is another enlarged, front elevational view showing a portion of the compound miter box of FIG. 1.

DETAILED DESCRIPTION OF THE PREFERRED EMBODIMENT

Referring to FIG. 1, the compound miter box of the present invention is generally designated by the reference numeral 10. Miter box 10 includes a bench 12, and an arm 16 pivotally mounted to the underside 17 of bench 12.

Bench 12 includes a generally rectangular platform 20 having first 22 and second 24 ends interconnected by a semi-circular disc 21. Each end 22, 24 includes a first, rearward leg 26 and a second forward leg 28 depending therefrom.

Bench 12 further includes a vertical sidewall 30 extending from longitudinal edge of platform 20 at an angle perpendicular to the top surface 32 of platform 20. Sidewall 30 includes a V-shaped notch 34 centered therein in order to accommodate saw blade 36, as shown in FIG. 1, and allow horizontal reciprocal movement thereof, as well as vertical downward movement of blade 36 through a board or other workpiece being cut. The foregoing construction is typical of most miter boxes in common use today.

Referring to FIG. 4, arm 16 is pivotally mounted to platform 20 by a bolt 38 which extends downwardly through an aperture 40 in disc 21, and into threaded hole 42 in arm 16. Arm 16 is supported by bolt head 39 of bolt 38 which rides on a shoulder 41 formed in the interior of aperture 40 in disc 21. Aperture 40 in disc 21 is located centrally in bench 12 and is centered in the V-shaped notch 34 on a vertical line through which saw blade 36 passes in making a cut at any horizontal angle.

A plate 44 is sandwiched between arm 16 and the bottom surface 18 of disc 21 in order to secure plate 44 therebetween. Plate 44 includes a pair of upwardly extending pins 46, 48 received within guide slots 50 and 52, respectively, which extend upwardly from the bottom surface 18 or disc 21 toward the top surface 54 of disc 21. Pins 46 and 48 in guide slots 50 and 52, respectively, guide rotational movement of arm 16 about bolt 38 as hereinafter described.

A lever 56 is pivotally secured to the underside 58 of arm 16 by a leaf spring 60. Leaf spring 60 is interconnected to arm 16 by a bolt 62 which is threaded into a threaded hole 64 in arm 16 such that a first end 66 of leaf spring 60 is sandwiched between bolt head 68 of bolt 62 and the underside 58 of arm 16. Lever 56 is pivotable about a pin 70 which extends from lever 56 and is received within a corresponding concave recess 72 in the underside 58 of arm 16. Lever 56 further includes a flanged end 74 which includes a flange 76 which extends through an opening 80 in arm 16 and is biased by leaf spring 60 into a user selected retaining groove 82 in the bottom of disc 21 so as to prevent rotational movement of arm 16 about bolt 38.

Arm 16 further includes an indicator assembly 77 mounted thereto for indicating the angle between arm 16 and vertical sidewall 30. Indicator assembly 77 includes an angle indicator 79 which is mounted by a mounting screw 81 to arm 16 just radially outwardly of a shoulder 83 on the outer periphery of disc 21. Shoulder 83 is defined by a planar annular horizontally disposed surface 85 and an annular cylindrical vertically disposed surface 87.

Angle indicator 79 includes an upper flange 93 having a diameter large enough to overlay the planar annular horizontally disposed surface 85 on the radially outer edge of disc 21. A protractor (not shown) may be provided on the outer edge of disc 21 to indicate the angle to vertical sidewall 30. A pointer 95, FIG. 3, is placed on the upper surface of upper flange 93 thereby allowing the user to align pointer 95 with a user selected angle along the protractor on disc 21 in order to set the angle between arm 16 and vertical sidewall 30.

In order to prevent rotational movement of angle indicator 79 about mounting screw 81, a peg 97, depending from angle indicator 79, is received within an opening 99 in arm 16 which, in turn, accurately aligns pointer 95 to the protractor on the outer edge of disc 21.

In operation, free end 84 of leaf spring 60 biases flanged end 74 of lever 56 upwardly so as to urge flange 76 into a retaining groove 82 and maintain arm 16 at a predetermined angle with respect to vertical sidewall 30. Second end 86 of lever 56 may be pushed upward to pivot lever 56 on pin 70, thereby removing the flange 74 from retaining groove 82 against the bias of leaf spring 60. Once flange 76 of lever 56 is removed from retaining groove 82, arm 16 may rotate with bolt 38 as pins 46 and 48 of plate 44 follow guide slots 50 and 52 in disc 21. This allows the user to align pointer 95 with a selected angle on the protractor about the outer edge of disc 21 so as to position arm 16 with respect to sidewall 30. When arm 16 is positioned so as to form a user selected angle with respect to sidewall 30, second end 86 of lever 56 may be released such that leaf spring 60 urges flanged end 74 of lever 56 upwardly. A plurality of retaining grooves in the underside of plate 21 are provided to receive flange 76 therein to retain arm 16 at various, user selected angles to sidewall 30.

Each end 88 and 90 of arm 16 includes a pair of parallel, downwardly extending tubular recesses 89 and 91. Each recess 89, 91 is adapted for receiving a tubular support leg 92 and 94, respectively, depending from the lower surface 96 of a receiving mount 98a, 98b. As best seen in FIGS. 2 and 4, each receiving mount 98a, 98b is secured to arm 16 by a pair of bolts 100 which extend through apertures 101, 103 in each end 88, 90, respectively, of arm 16, and into threaded aperture 102 in tubular support leg 92 and into threaded aperture 104 in tubular support leg 94, respectively.

Referring to FIG. 1, saw 106 includes saw blade 36 which is guided by first 108 and second 110 pairs of spaced, parallel guide rods 112. Each guide rod 112 is retained in a retaining mount 114, FIG. 2. Each retaining mount 114 includes a first arcuate surface 116 which slides along a corresponding concave arcuate surface 118 in each receiving mount 98a, 98b. Each retaining mount 114 further includes a second arcuate surface 120 which forms a plurality of tabs 122. Tabs 122 engage and form a mating relationship with concave tab receiving depressions 124 formed in a second concave arcuate surface 126 on each receiving mount 98a, 98b.

In order to position the pairs 108, 110 of guide rods 112 at a user selected angle to bench 12, each tab 122 of each retaining mount 114 is aligned with a corresponding concave tab receiving depression 124 in each receiving mount 98a, 98b. The angle of the guide rods 112 to bench 12 is determined by turning each retaining mount 114 to a user's selected angle with respect to platform 20, and thereafter locking each retaining mount 114 to its corresponding receiving mount 98a, 98b.

As illustrated in FIGS. 4–6, each retaining mount 114 is locked on its corresponding receiving mount 98a, 98b by means of a bolt 128 which extends through a locating hole 130a–130e in each retaining mount 114 and is threaded into a threaded hole 132 in each receiving mount 98a, 98b. Each retaining mount 114 must be locked in its corresponding receiving mount 98a, 98b through the comparable locating hole 130a–130e in each receiving mount 98a, 98b. By way of example, with respect to mount 98a, FIG. 5, receiving bolt 128 extends through locating hole 130c in retaining mount 114, and into threaded hole 132 of receiving mount 98a, and, with respect to receiving mount 98b, bolt 128 must also extend through locating hole 130c in retaining mount 114, and into threaded hole 132 of receiving mount 98b in order for the guide rods 112 to be perpendicular to bench 12.

In order to change the angle formed between the pairs 108, 110 of guide rods 112 and bench 12, each bolt 128 is unthreaded from threaded hole 132 in each receiving mount 98a, 98b so as to allow each bolt 128 to be removed from the selected locating hole in each retaining mount 114. This, in turn, allows each retaining mount 114 to be turned to a predetermined angle, as previously described, and locked to its respective receiving mounts 98a and 98b.

Referring to FIG. 6, for example, each bolt 128 is inserted through hole 130a in each retaining mount 114, and thereafter threaded into threaded hole 132 in each receiving mount 98a, 98b, respectively. As shown in FIG. 6, support rods 112 deflect along with retaining mounts 114 to the left to form with bench 12 an angle of 45°.

Various modes of carrying out the invention are contemplated as being within the scope of the following claims particularly pointing out and distinctly claiming the subject matter regarded as the invention.

I claim:

1. A compound miter box, comprising:
    a generally rectangular bench;
    an arm having first and second ends, the arm pivotally mounted to and supported under the bench;
    first and second retaining mounts, each retaining mount having an arcuate retaining surface and the first retaining mount having a tab defined on the arcuate retaining surface;
    first and second saw supports, each saw support having a pair of spaced parallel guide rods mounted to a corresponding one of said retaining mounts;
    first and second receiving mounts, each receiving mount mounted to a corresponding one of said ends of the arm and including an arcuate receiving surface, the arcuate receiving surface of the first receiving mount defining a plurality of tab receiving depressions therein such that each tab receiving depression corresponds to a predetermined angle between each rod of the saw supports and the bench, wherein each retaining mount is supported within a corresponding one of said receiving mounts such that each arcuate retaining surface forms a slidable interface with a corresponding arcuate receiving surface and the tab defined on the arcuate retaining surface of the first retaining mount is received within a user selected one of said tab receiving depressions in the arcuate receiving surface of the first receiving mount.

2. The compound miter box of claim 1 further comprising a means for maintaining of the tab within the user selected tab receiving depression.

3. The compound miter box of claim 2 wherein the first retaining mount and the first receiving mount each include an aperture extending therethrough, each aperture in axial alignment when the tab is received within the user selected tab receiving depression.

4. The compound miter box of claim 3 wherein the means for maintaining the tab within the user selected tab receiving depression includes a pin extending through the aperture in the first retaining mount and into the aperture in the first receiving mount.

5. The compound miter box of claim 1 wherein the generally rectangular bench includes a vertical sidewall extending from the bench at an angle perpendicular to the bench.

6. The compound miter box of claim 5 wherein the vertical sidewall includes a V-shaped notch centered therein for accommodating a saw blade.

7. The compound miter box of claim 6 further including a means for maintaining the arm at a predetermined angle to the vertical sidewall extending from the bench.

8. The compound miter box of claim 7 wherein the underside of the bench includes a plurality of locating recesses, each recess corresponding to a distinct angle between the arm and the vertical sidewall.

9. The compound miter box of claim 8 wherein the means for maintaining the arm at a predetermined angle with respect to the vertical sidewall of the bench includes a locking pin extending from the arm for receipt in a user selected one of said locating recesses on the underside of the bench, the locking pin movable between a first locking position wherein the locking pin is received within the user selected recess, and an unlocking position which allows the arm to pivot.

10. The compound miter box of claim 9 further comprising a means for biasing the locking pin toward the locking position.

11. The compound miter box of claim 10 wherein the means for biasing the locking pin toward the locking position includes a leaf spring.

12. A compound miter box, comprising:
a saw bench having an upper work supporting surface, and an underside;
a saw supporting arm having first and second ends, the saw supporting arm mounted to the underside of the saw bench and
first and second saw supports, each saw support including a pair of spaced parallel saw guide rods and a retaining mount, the retaining mount of the first saw support including an arcuate bearing surface defining a locating tab thereon;
first and second receiving mounts, each receiving mount extending from a corresponding one of said ends of the saw supporting arm, the first receiving mount including an arcuate bearing surface defining a plurality of tab receiving depressions therein, each tab receiving depression corresponding to a predetermined angle between the saw guide rods and the work supporting surface of the bench and dimensioned for receiving the locating tab therein; and
means for securing the locating tab of the retaining mount of the first saw support in a user selected one of said tab receiving depressions in the first receiving mount.

13. The compound miter box of claim 12 wherein the retaining mount of the first saw support and the first receiving mount each include an aperture extending therethrough, both apertures in axial alignment when the locating tab is received within the user selected tab receiving depression.

14. The compound miter box of claim 13 wherein the means for securing the tab within the user selected tab receiving depression includes a pin extending through the aperture in the retaining mount of the first saw support and aperture in the first receiving mount.

15. The compound miter box of claim 12 wherein the saw bench includes a vertical sidewall extending from the saw bench at an angle perpendicular to the saw bench.

16. The compound miter box of claim 15 wherein the vertical sidewall includes a V-shaped notch centered therein for accommodating a saw blade.

17. The compound miter box of claim 16 further including a means for maintaining the saw supporting arm at a predetermined angle to the vertical sidewall extending from the saw bench.

18. The compound miter box of claim 17 wherein the underside of the saw bench includes a plurality of locating recesses, each recess corresponding to a distinct angle between the saw supporting arm and the vertical sidewall.

19. The compound miter box of claim 18 wherein the means for maintaining the saw supporting arm at a predetermined angle with respect to the vertical sidewall of the saw bench includes a locking pin extending from the arm for receipt in a user selected one of said locating recesses on the underside of the saw bench, the locking pin movable between a first locking position wherein the locking pin is received within the user selected recess, and an unlocking position which allows the saw supporting arm to pivot.

20. The compound miter box of claim 19 further comprising a means for biasing the locking pin toward the locking position.

21. The compound miter box of claim 20 wherein the means for biasing the locking pin toward the locking position includes a leaf spring.

22. A compound miter box, comprising:
a saw bench having an upper work supporting surface, and an underside;
a saw supporting arm having first and second ends, the supporting arm mounted to the underside of the saw bench and pivotable about a longitudinal axis perpendicular to the work supporting surface;
first and second saw supports, each saw support including a retaining mount and a pair of spaced, parallel saw guide rods extending therefrom; and
first and second receiving mounts, wherein each receiving mount supports a corresponding one of said retaining mounts such that each of the pair of receiving mounts and the corresponding retaining mount have one of an arcuate bearing surface defining a locating tab thereon and an arcuate bearing surface defining a plurality of tab receiving depressions therein, each tab receiving depression corresponding to a predetermined angle between the saw guide rods and the work supporting surface of the bench and dimensioned for receiving the locating tab therein.

23. The compound miter box of claim 22 further comprising a means for securing the locating tab in a user selected one of said tab receiving depressions.

24. The compound miter box of claim 23 where the first receiving mount and the retaining mount supported therein each include an aperture extending therethrough, both apertures in axial alignment when the locating tab is received within the user selected tab receiving depression.

25. The compound miter box of claim 24 wherein the means for securing the tab within the user selected tab receiving depression includes a pin extending through the aperture in the retaining mount and into the aperture in the receiving mount.

26. The compound miter box of claim 23 wherein the saw bench includes a vertical sidewall extending from the saw bench at an angle perpendicular to the saw bench.

27. The compound miter box of claim 26 wherein the vertical side wall includes a V-shaped notch centered therein for accommodating a saw blade.

28. The compound miter box of claim 27 further including a means for maintaining the saw supporting arm at a predetermined angle to the vertical side wall extending from the saw bench.

29. The compound miter box of claim 28 wherein the underside of the saw bench includes a plurality of locating recesses, each recess corresponding to a distinct angle between the saw supporting arm and the vertical side wall.

30. The compound miter box of claim 29 wherein the means for maintaining the saw supporting arm at a predetermined angle with respect to the vertical side wall of the saw bench includes a locking pin extending from the arm for receipt in the user selected locating recess on the underside of the saw bench, the locking pin movable between a first locking position wherein the locking pin is received within the user selected locating recess, and an unlocking position wherein the saw supporting arm is allowed to pivot.

31. The compound miter box of claim 30 further comprising a means for biasing the locking pin toward the locking position.

32. The compound miter box of claim 31 wherein the means for biasing the locking pin toward the locking position includes a leaf spring.

* * * * *